United States Patent
Usui et al.

(10) Patent No.: US 8,119,190 B2
(45) Date of Patent: Feb. 21, 2012

(54) METHOD FOR APPLYING ELECTRODE MIXTURE PASTE AND APPLICATION APPARATUS

(75) Inventors: Hiroyuki Usui, Kanagawa (JP); Masahiko Kato, Kanagawa (JP); Toru Okamoto, Kanagawa (JP); Tadakazu Seto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1112 days.

(21) Appl. No.: 11/919,993

(22) PCT Filed: Mar. 6, 2006

(86) PCT No.: PCT/JP2006/304273
§ 371 (c)(1),
(2), (4) Date: Dec. 4, 2007

(87) PCT Pub. No.: WO2006/120793
PCT Pub. Date: Nov. 16, 2006

(65) Prior Publication Data
US 2009/0068346 A1    Mar. 12, 2009

(30) Foreign Application Priority Data
May 9, 2005  (JP) .................................. 2005-135543

(51) Int. Cl.
*B05D 5/12* (2006.01)
*B05D 3/12* (2006.01)
*B29D 7/00* (2006.01)
*D06M 15/643* (2006.01)
*B21C 47/00* (2006.01)
*C23C 14/56* (2006.01)
*B05C 11/00* (2006.01)

(52) U.S. Cl. ............ 427/77; 427/177; 427/178; 118/44; 118/712

(58) Field of Classification Search .................... 427/209
See application file for complete search history.

(56) References Cited

U.S. PATENT DOCUMENTS
5,549,864 A * 8/1996 Greene et al. ................. 264/280
(Continued)

FOREIGN PATENT DOCUMENTS
| JP | 09-017419 | 1/1997 |
|---|---|---|
| JP | 09-017420 | 1/1997 |
| JP | 2000-228188 A | 8/2000 |

(Continued)

OTHER PUBLICATIONS

Extended European Search Report issued in European Patent Application No. EP 06 71 5293.4 dated Nov. 2, 2009.

*Primary Examiner* — James Lin
*Assistant Examiner* — Austin Murata
(74) *Attorney, Agent, or Firm* — McDermott Will & Emery LLP (57) ABSTRACT

A method for applying an electrode mixture paste includes: a first step of unwinding a core material (2) wound in a coil shape; a second step of applying an electrode mixture paste (5) onto the core material; a third step of adjusting an application amount of the electrode mixture paste; a fourth step of drying a paste-coated sheet (6) with the electrode mixture paste applied to the both sides thereof; and a fifth step of winding the paste-coated sheet in a coil shape. In this method, in one of the second and third steps, a core material-exposed portion (9) to which the electrode mixture paste is not applied is provided in both edge portions in a width direction of the core material, and, in the fourth step, a holding unit is provided in at least one position, the holding unit continuously holding the core material-exposed portion between a wheel type roller (10) and a contact belt (11) and changing a traveling direction of the paste-coated sheet. A stable electrode mixture paste application method can be achieved by preventing the occurrence of wrinkles formed when the electrode mixture paste containing a high specific gravity material is applied and dried in order to avoid the reduction in application accuracy due to the flow of the electrode mixture paste.

2 Claims, 6 Drawing Sheets

U.S. PATENT DOCUMENTS

| | | | |
|---|---|---|---|
| 6,649,033 B2 * | 11/2003 | Yagi et al. | 204/192.23 |
| 2002/0034400 A1 * | 3/2002 | Asuwa et al. | 399/165 |
| 2003/0118913 A1 * | 6/2003 | Takami et al. | 429/337 |
| 2005/0158106 A1 * | 7/2005 | Winter et al. | 400/619 |

FOREIGN PATENT DOCUMENTS

| | | | |
|---|---|---|---|
| JP | 2000-353513 A | | 12/2000 |
| JP | 2000-353514 A | | 12/2000 |
| JP | 2001-149840 | * | 5/2001 |

* cited by examiner

METHOD FOR APPLYING ELECTRODE MIXTURE PASTE AND APPLICATION APPARATUS

RELATED APPLICATIONS

This application is the U.S. National Phase under 35 U.S.C. §371 of International Application No. PCT/JP2006/304273, filed on Mar. 6, 2006, which in turn claims the benefit of Japanese Application No. 2005-135543, filed on May 9, 2005, the disclosures of which Applications are incorporated by reference herein.

TECHNICAL FIELD

The present invention relates to a method and an apparatus for applying an electrode mixture paste to a core material made of porous metal thin plate. In particular, the invention relates to an improvement of a method for drying the electrode mixture paste.

BACKGROUND ART

Batteries such as alkaline storage batteries and lithium ion secondary batteries are widely used as the power source for portable devices, machine tools, or electric vehicles. Of these, nickel metal-hydride storage batteries have a relatively high energy density and excellent durability, and the applications thereof, including as power sources for electric vehicles, are being expanded.

Generally, the main components of nickel metal-hydride storage batteries include: a positive electrode formed by filling a three-dimensional metal porous material with nickel hydroxide and other materials; and a negative electrode formed by applying an electrode mixture paste composed of a hydrogen-absorption alloy and other materials to porous metal thin plate (hereinafter simply abbreviated as a "core material") such as a punched metal. Of these two, the negative electrode can be produced continuously because of the nature of its production process, which has received attention as a highly efficient process. Specifically, a method has been proposed in which, after the core material is immersed in the electrode mixture paste, the application amount of the electrode mixture paste is adjusted to produce a paste-coated sheet.

As a method for drying a paste-coated sheet, a method is exemplified in which a paste-coated sheet is made to continuously travel through a drying furnace which generates hot air or far infrared radiation. In terms of improving the ease of conveyance of a paste-coated sheet and space saving, a method is often employed in which a paste-coated sheet is brought into contact with rollers provided at several positions, so that the traveling direction is changed by approximately 90 degrees. In this method, traveling stability is high since a suitable tension can be applied between the rollers, and the space in the height direction can be utilized. Accordingly, it is conceivable to realize a drying step excellent in space efficiency.

Figure 6:
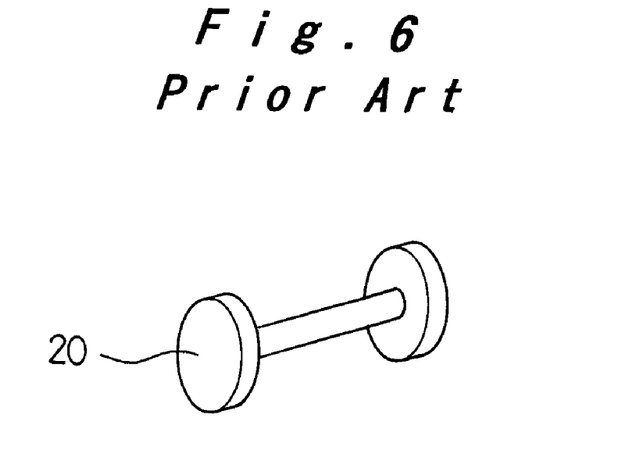
FIG. 6 is a schematic view of a wheel type roller in a conventional apparatus.

However, when a paste-coated sheet in a wet state is brought into contact with a flat roller, the electrode mixture paste is transferred thereto. Hence, insufficiently dried portions of the paste-coated sheet are brought into contact with wheel type rollers as shown in FIG. 6. When an electrode mixture paste is actually applied and dried utilizing such wheel type rollers, generally, the electrode mixture paste is removed from both edge portions in the width direction of a paste-coated sheet to provide core material-exposed portions, and the paste-coated sheet is made to travel while the core material-exposed portions are clipped (see, for example, Patent Document 1).

[Patent Document 1] Japanese Patent Laid-Open Publication No. 9-017420

DISCLOSURE OF THE INVENTION

Problems to be Solved by the Invention

Figure 7:
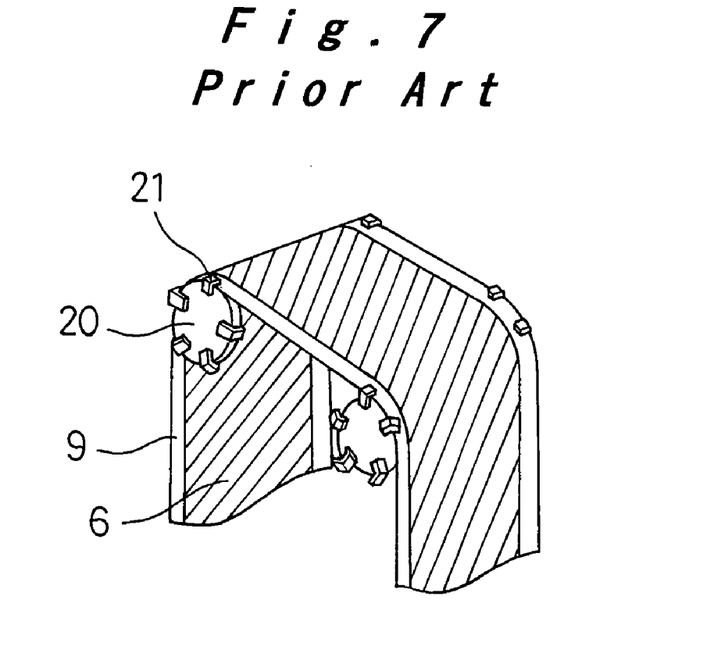
FIG. 7 is an enlarged schematic view of a holding unit in the conventional apparatus.

Generally, in an electrode mixture paste for nickel metal-hydride storage batteries, the specific gravities of the materials used are high (for example, approximately 8 g/ml for a hydrogen-absorption alloy). Therefore, when such an electrode mixture paste is applied in order to form a thick layer thereof, the weight per unit area of a coated portion in the paste-coated sheet is considerably high. The method in Patent Document 1 is a method in which a core material-exposed portion 9 of a paste-coated sheet 6 is partially held between a wheel type roller 20 and a contact pin 21, and the paste-coated sheet 6 is held intermittently on the wheel type roller 20, as shown in FIG. 7. In this method, the paste-coated sheet 6 is brought into tangential contact with the wheel type roller 20, and the wheel type roller 20 starts rotating. However, when the application amount of the paste is large as described above, the deflection of the central portion of the paste-coated sheet 6 due to gravity cannot be prevented in a portion not held by the contact pin 21 when the rotation is started. Therefore, wrinkles originating from the wheel type roller 20 are formed in the paste-coated sheet 6 to cause the flow of the electrode mixture paste, whereby the application accuracy is reduced.

The present invention has been made in view of the foregoing problems. Accordingly, it is an object of the invention to provide a stable method for applying an electrode mixture paste containing a high specific gravity material. In this method, the reduction in application accuracy due to the flow of the electrode mixture paste can be avoided by preventing the occurrence of wrinkles formed when the electrode mixture paste is applied and dried.

Means for Solving the Problems

In order to achieve the above object, the present invention provides a method for applying an electrode mixture paste. The method includes: a first step of unwinding a core material wound in a coil shape; a second step of applying an electrode mixture paste to the core material; a third step of adjusting an application amount of the electrode mixture paste; a fourth step of drying a paste-coated sheet with the electrode mixture paste applied to the both sides thereof; and a fifth step of winding the paste-coated sheet in a coil shape, wherein, in one of the second and third steps, a core material-exposed portion to which the electrode mixture paste is not applied is provided in both edge portions in a width direction of the core material, and wherein, in the fourth step, a holding unit is provided in at least one position, the holding unit continuously holding the core material-exposed portion between a wheel type roller and a contact belt and changing a traveling direction of the paste-coated sheet.

As means for realizing the above-described application method, the present invention provides an apparatus for applying an electrode mixture paste. The apparatus includes: an uncoiler unit for unwinding a core material wound in a coil shape; a paste application unit for applying an electrode mixture paste to the core material; an application amount adjusting unit for adjusting an application amount of the electrode mixture paste; a drying unit; and a coiler unit for winding a paste-coated sheet, after drying, in a coil shape, wherein one of the paste application unit and the application amount adjusting unit includes a paste removing unit for removing the electrode mixture paste applied to both edge portions in a width direction of the core material to form a core material-exposed portion, and wherein the drying unit includes a holding unit disposed in at least one position, the holding unit continuously holding the core material-exposed portion between a wheel type roller and a contact belt and changing a traveling direction of the paste-coated sheet.

As described above, when the contact belt of a line contact type is employed in place of the contact pin of a point contact type in Patent Document 1, the core material-exposed portion of the paste-coated sheet can be continuously held between this contact belt and the wheel type roller. Accordingly, in contrast to the case of Patent Document 1, the deflection of the central portion of the paste-coated sheet due to gravity can be prevented. Therefore, since the wrinkles originating from the wheel type roller is not formed in the paste-coated sheet, the reduction in application accuracy caused by the flow of the electrode mixture paste can be avoided.

BEST MODE FOR CARRYING OUT THE INVENTION

Hereinbelow, the best mode for carrying out the invention will be described in detail with reference to the drawings.

Figure 1:
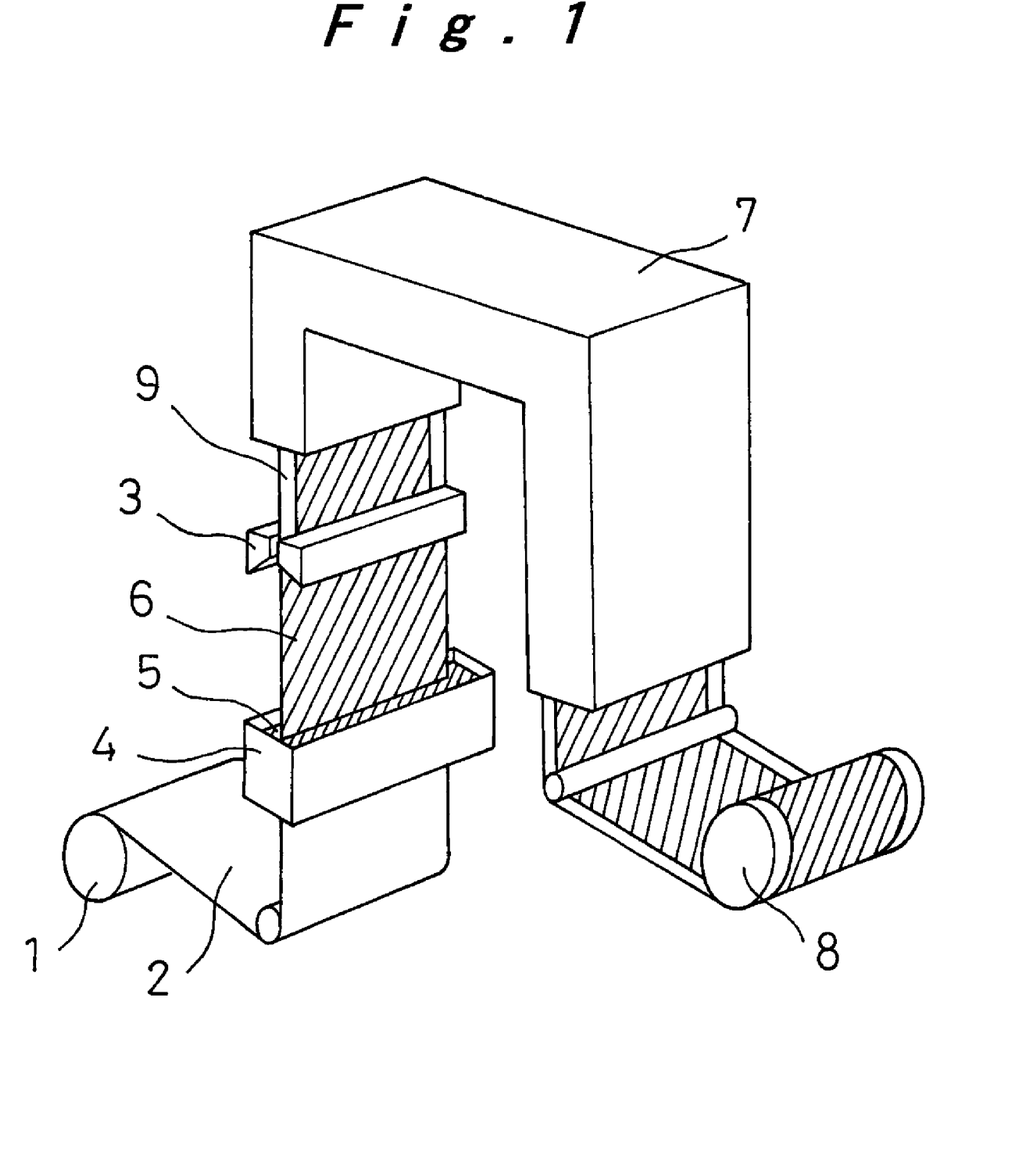
FIG. 1 is a schematic view of an electrode mixture paste application apparatus of the present invention.

FIG. 1 is a schematic view of an electrode mixture paste application apparatus of the present invention. A coil-shaped core material 2 made of porous metal thin plate is unwound by an uncoiler unit 1. Subsequently, the core material 2 is introduced into a paste application unit 4 filled with an electrode mixture paste 5, and the electrode mixture paste 5 is applied onto the core material 2. Next, the core material 2 passes through an application amount adjusting unit 3 to form a paste-coated sheet 6. Then, the paste-coated sheet 6 is introduced into a drying unit 7 and thereafter is wound in a coil shape on a coiler unit 8.

Figure 2A:
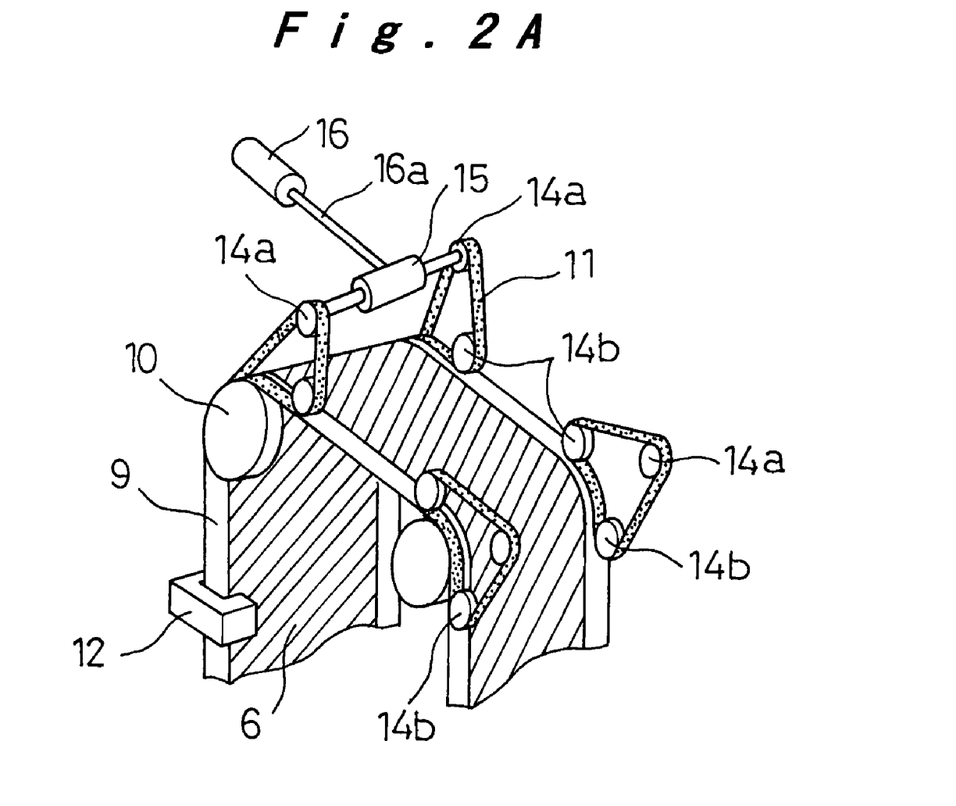
FIGS. 2A and 2B show the configuration of a holding unit in the apparatus of the present invention, FIG. 2A being an enlarged schematic view of the configuration of the holding unit, FIG. 2B being a schematic configuration view of a driving force transmission unit.
Figure 3:
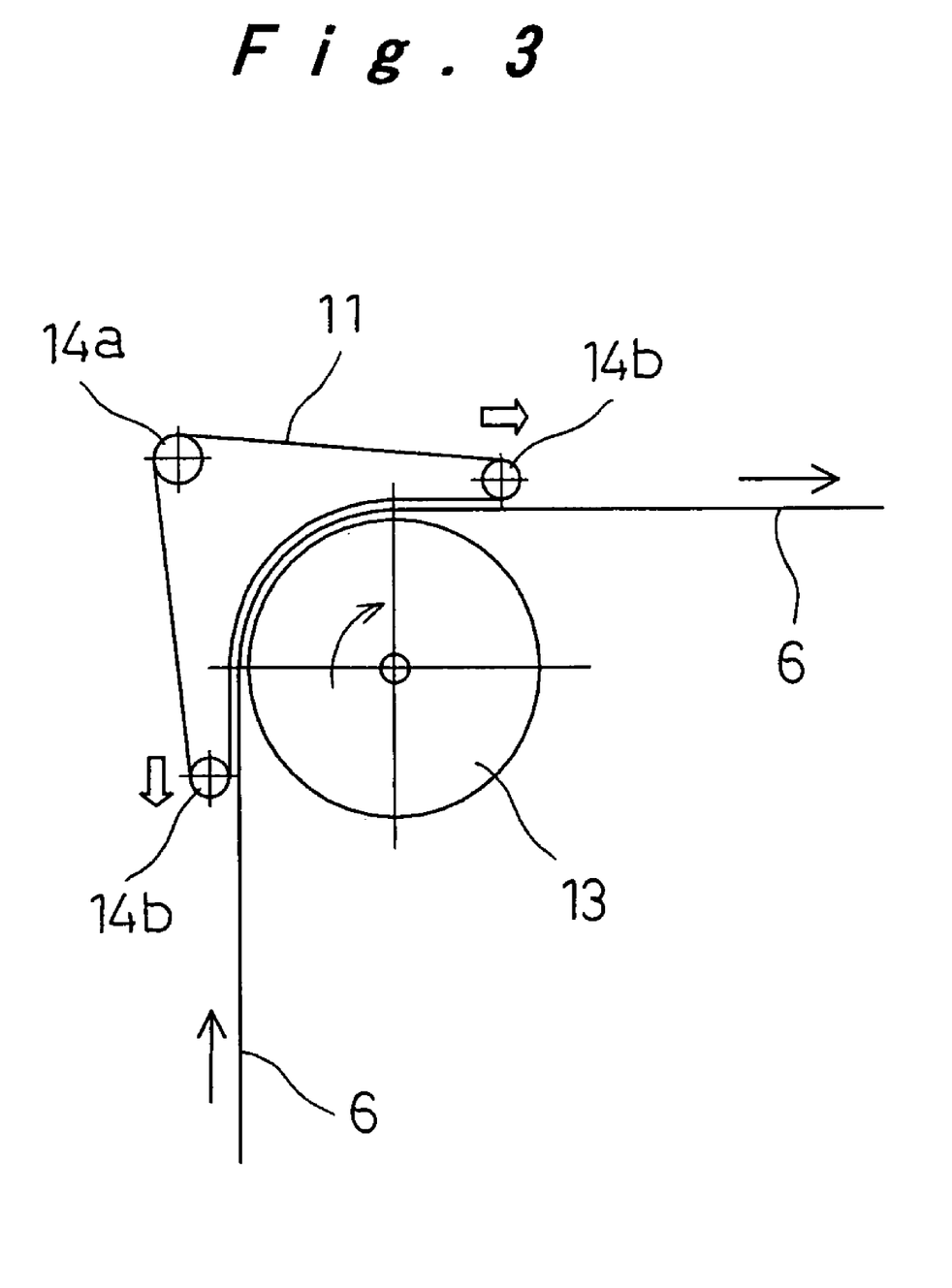
FIG. 3 is a view illustrating a held state of a core material-exposed portion held between a wheel type roller and a contact belt in the apparatus of the present invention.

FIG. 2A is an enlarged schematic view of the inside of the drying unit 7 in this apparatus. The traveling direction of the paste-coated sheet 6 is changed by wheel type rollers 10 from a perpendicular direction to a horizontal direction. However, only each of core material-exposed portions 9 is brought into contact with a corresponding one of the wheel type rollers 10. FIG. 3 is a view illustrating the feature of a holding unit for continuously holding each of the core material-exposed portions 9 between the corresponding wheel type roller 10 and a corresponding contact belt 11. Each core material-exposed portion 9 enters along a tangential direction of the wheel type roller 10 and is continuously held by the contact belt 11 that is looped over contact belt-orienting pulleys 14a and 14b. Accordingly, the paste-coated sheet 6 undergoes an appropriate and uniform tension in the width direction thereof from the beginning of the rotation of the coiler unit 8 and leaves along a tangential direction with its surface held flat. It is needless to say that, at that time, the contact belt 11 holds the paste-coated sheet 6 until a tangent point. Furthermore, the contact belt 11 can exert an appropriate tension by changing the positions of the contact belt-orienting pulleys 14a and 14b in directions shown by open arrows in FIG. 3. An air cylinder, for example, can be used as a device for exerting the tension. According to this configuration, the deflection of the central portion of the paste-coated sheet 6 due to gravity can be prevented continuously even when the electrode mixture paste 5 contains a high specific gravity material. Therefore, wrinkles originating from the wheel type roller 10 are not formed in the paste-coated sheet 6, and the reduction in application accuracy due to the flow of the electrode mixture paste 5 can be avoided.

In FIG. 1, the core material-exposed portions 9 are formed in the application amount adjusting unit 3. Specifically, the core material-exposed portions 9 can be formed by putting resin-made chips or the like on the paste-coated sheet 6 from the respective sides of the paired application amount adjusting unit 3 such that the resin-made chips are brought into contact with the respective edge portions in the width direction of the paste-coated sheet 6. In addition to this method, a method, for example, may be used in which after a masking tape having a predetermined size is applied to both edge portions in the width direction of the core material 2, the core material 2 is allowed to pass through the paste application unit 4 and the masking tape is peeled off after the core material 2 has passed through the paste application unit 4.

In order to appropriately bring the contact belt 11 into contact with the core material-exposed portion 9 in a holding unit, it is preferable to use a method in which the contact belt 11 is looped over a plurality of the contact belt-orienting pulleys 14a and 14b and is rotated as shown in FIG. 2A. In this method, the core material-exposed portion 9 can be continuously held between the contact belt 11 and a rotation roller 13 of the wheel type roller 10 in such a manner that the core material-exposed portion 9 travels along about one quarter of the periphery of the rotation roller 13 of the wheel type roller 10 (see FIG. 3). In this case, the sizes and the numbers of the contact belt-orienting pulleys 14a and 14b can be selected appropriately. However, when the traveling direction of the paste-coated sheet 6 is changed by approximately 180° by the holding unit, it is preferable to provide at least two contact belt-orienting pulleys 14 in addition to those provided in the holding unit.

Figure 2B:
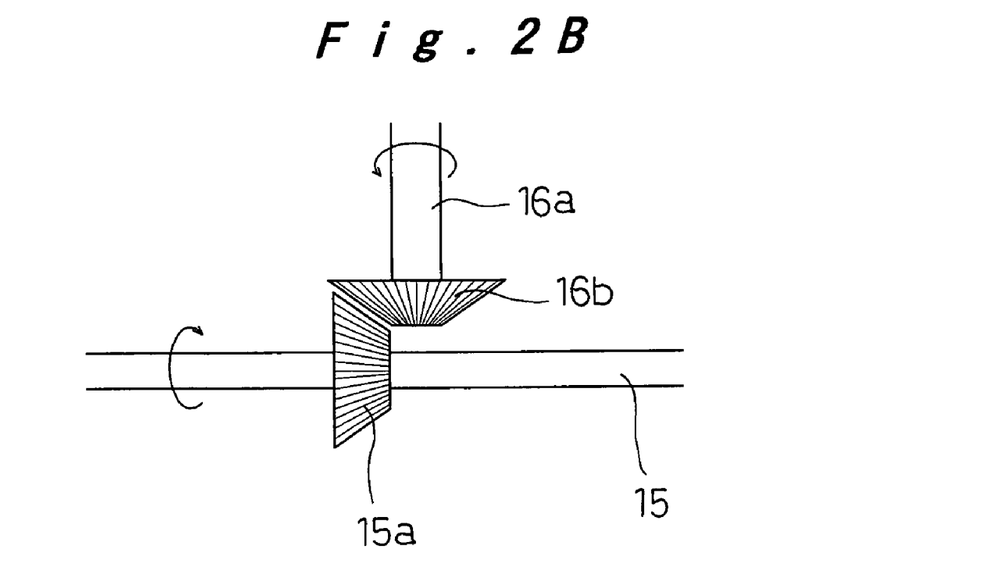

Among the orienting pulleys 14a and 14b shown in FIGS. 2A and 3, the orienting pulley 14a not contacting the core material-exposed portion 9 of the paste-coated sheet 6 is a driving pulley. A pair of the orienting pulleys 14a arranged in the width direction of the paste-coated sheet 6 are coupled to each other through a shaft 15 and are rotated at a desired speed by a single pulley driving motor 16. The orienting pulleys 14b contacting the core material-exposed portion 9 of the paste-coated sheet 6 are driven pulleys and are rotated with the motion of the contact belt 11 driven by the rotation of the orienting pulley 14a. A driving force transmission unit between a shaft 16a extending from the driving motor 16 and the shaft 15 coupling the opposing orienting pulleys 14a to each other may be composed of, for example, a driving motor side bevel gear 16b provided at an end of the shaft 16a and a shaft side bevel gear 15a engaging with the driving motor side bevel gear 16b, as shown in FIG. 2B.

Figure 4A:
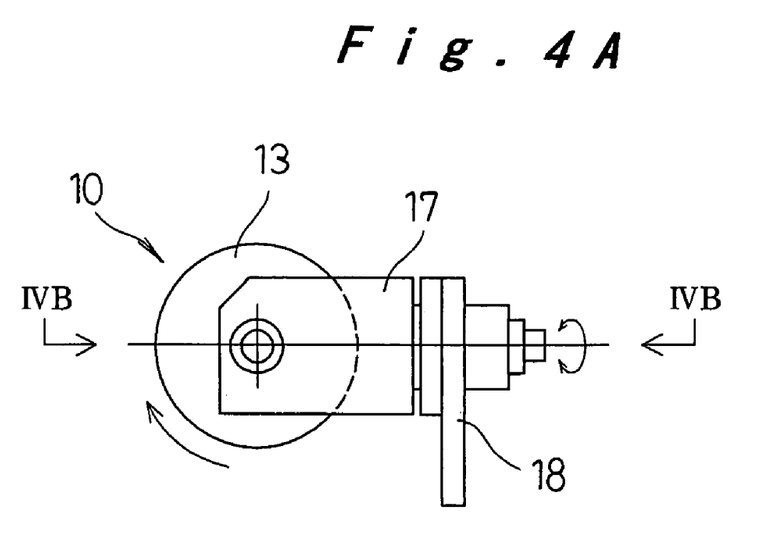
FIGS. 4A and 4B show the configuration of the wheel type roller in the apparatus of the present invention, FIG. 4A being a side view, FIG. 4B being a cross-sectional view taken along line IVB-IVB in FIG. 4A.
Figure 4B:
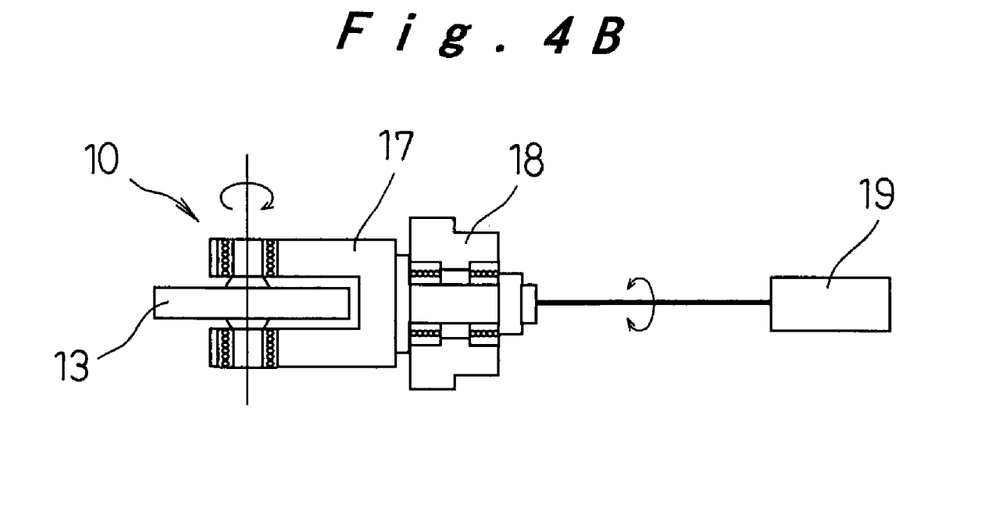

FIGS. 4A and 4B show the configuration of the wheel type roller 10. The wheel type roller 10 includes: the rotation roller 13; a two-pronged shaped first body part 17 rotatably holding the rotation roller 13 near the end portion thereof; and a second body part 18 which supports the two-pronged shaped first body part 17 so as to allow the rotation of the first body part 17 in the traveling direction of the core material 2. A bearing for providing smooth rotation of the rotation roller 13 is provided between the shaft of the rotation roller 13 and a shaft hole provided near each end portion of the two-pronged shaped first body part 17. Similarly, a bearing for providing smooth rotation of the first body part 17 is provided between the shaft extending on the other end side of the first body part 17 and the second body part 18. The rear end of the shaft extending on the other end side of the first body part 17 is coupled to a meandering motion control motor 19 for allowing rotational motion for controlling the meandering motion of the paste-coated sheet 6. Although not shown in the figures, the rotation roller 13 is driven by the pulley driving motor 16 described above. In the method for driving the rotation roller 13, the rotation roller 13 may be mechanically rotated in synchronization with the rotation of the orienting pulley 14a or may be synchronously rotated through a driving control unit.

Figure 5:
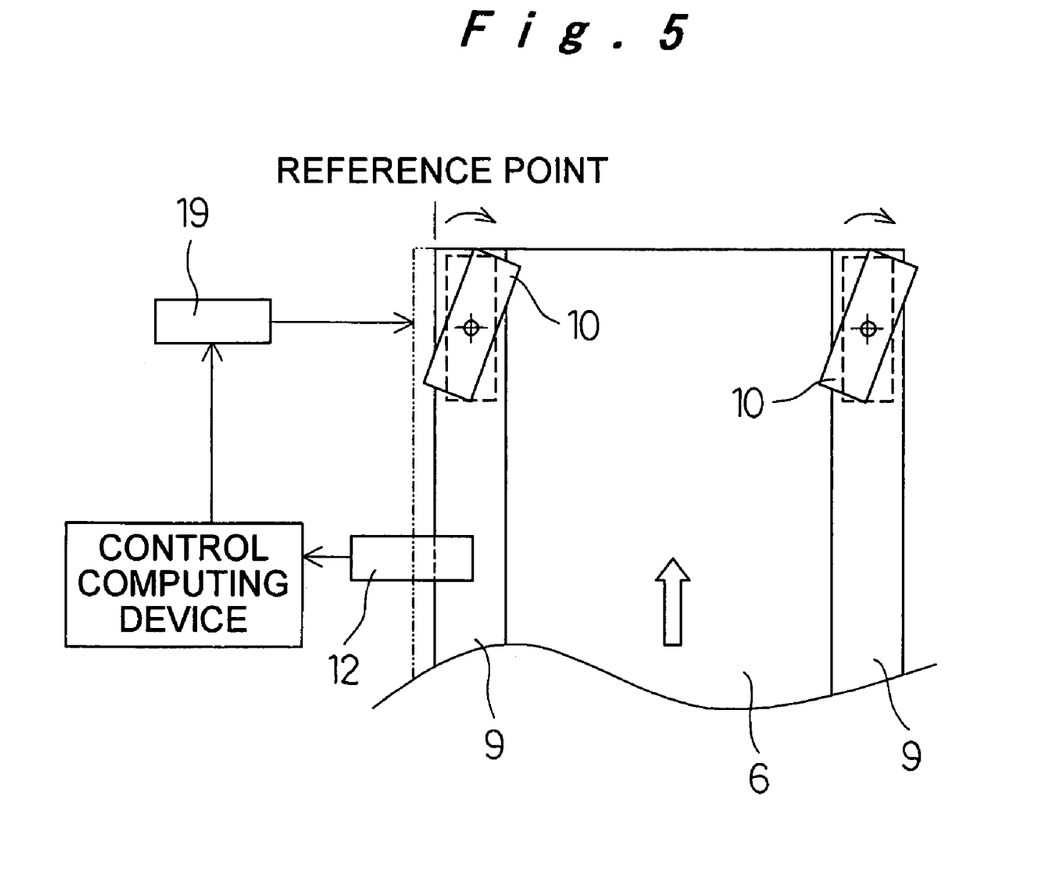
FIG. 5 is a schematic view illustrating the surroundings of a meandering motion controlling-detecting unit in the apparatus of the present invention.

FIG. 5 is a schematic view illustrating the surroundings of a meandering motion controlling-detecting unit 12. Since the core material 2 is made of porous metal thin plate, stress-strain at the time of perforation may remain therein. Therefore, the meandering motion thereof may become apparent as the core material 2 is supplied from the uncoiler unit 1. In such a case, it is effective to detect the amount of the meandering motion of the paste-coated sheet 6 by the meandering motion detecting unit 12 within the drying unit 7 before the paste-coated sheet 6 passes through the wheel type roller 10 and then to change the angle of the wheel type roller 10 with respect to the traveling direction of the core material 2 according to the amount of the meandering motion. Specifically, the boundary between the coated portion and the core material-exposed portion 9 of the paste-coated sheet 6 is detected by the meandering motion detecting unit 12, and the amount of the meandering motion is converted into numbers using a control computing device. When the amount of the meandering motion deviates from a reference point (a specified range) in the left direction in the figure as depicted by a chain double-dashed line, a method is generally used in which the meandering motion is corrected by changing the orientation of the wheel type roller 10 in a direction opposite to the direction of the meandering motion using the meandering motion control motor 19. When the direction of the meandering motion of the paste-coated sheet 6 is opposite to the direction shown in FIG. 5, the orientation of the wheel type roller 10 may be changed in a direction opposite to the direction in the example of FIG. 5. Independent meandering motion control motors 19 may be provided for the respective left and right wheel type rollers 10 and may be synchronized through an actuator.

When the meandering motion of the paste-coated sheet 6 is controlled, the wheel type roller 10 is inclined with respect to the traveling direction of the core material 2, but the orienting pulleys 14a and 14b need not be inclined. This is because, since the contact belt 11 is elastic, only a portion of the paste-coated sheet 6 which is held by the contact belt 11 is moved from the reference point so as to follow the inclination of the wheel type roller 10 (see FIG. 5).

The holding unit of the present invention must be disposed at a position where the electrode mixture paste 5 is in a wet state. However, such a position serves as the origin occurring wrinkles of the paste-coated sheet 6. Accordingly, it is desirable that a flat roller which can contact the entire width of the paste-coated sheet 6 be disposed at a position where the electrode mixture paste 5 is dried to the extent that it is less likely to be transferred.

In the embodiment shown in FIG. 1, the application amount adjusting unit 3 is separated from the paste application unit 4. However, it is needless to say that the effect of the present application is obtained also in an embodiment in which the application amount adjusting unit 3 and the paste application unit 4 are integrated like as a die-coater.

Hereinbelow, Examples of the present invention are described using a negative electrode (a hydrogen-absorption alloy electrode) for a nickel metal-hydride storage battery. Of course, the present invention is not limited to Examples, so long as the core material is made of porous metal thin plate. The invention can be applied to a sintered substrate which is a precursor of a sintered nickel positive electrode for an alkaline storage battery and to positive and negative electrodes for a lithium polymer battery in which a metal lath is used as the porous metal thin plate.

EXAMPLE 1

An iron-made punched metal (the overall length of a coil: 200 m) plated with nickel and having a thickness of 60 μm, a width of 300 mm, a punched hole diameter of 1 mm, and a pore rate of 42% was used as the core material 2. The core material 2 was wound while the tension is unbalanced in the width direction, whereby the amount of the meandering motion was adjusted to 0.02 to 0.03 mm/m (4 to 6 mm for 200 m) in advance.

A hydrogen-absorption alloy represented by a chemical formula of $MmNi_{3.55}Co_{0.75}Mn_{0.4}Al_{0.3}$ was pulverized into particles, having an average diameter of 30 μm, in water using a wet ball-mill, thereby obtaining the hydrogen-absorption alloy powder. The alloy powder was immersed in an alkali aqueous solution for surface treatment. Subsequently, 10 kg of an aqueous solution of carboxymethyl cellulose (solid content ratio: 1.5%) and 0.4 kg of Ketjen black were added to 100 kg of the hydrogen-absorption alloy powder, and the mixture was kneaded. Furthermore, 1.75 kg of an aqueous solution of styrene-butadiene copolymer rubber particles (solid content ratio: 40%) was added thereto, and the resultant mixture was stirred, thereby producing an electrode mixture paste 5.

Then, this electrode mixture paste 5 was applied at a rate of 5 m/min to both sides of the above-mentioned core material 2 by means of the application apparatus shown in FIG. 1 so as to obtain an overall thickness after application of 260 μm while the electrode mixture paste 5 was shaved off from an area within 20 mm from each of the edges so as to obtain a coated width of 260 mm, whereby the paste-coated sheet 6 was produced. In the holding unit of the drying unit 7, the core material-exposed portion 9 was held between the wheel type roller 10 and the contact belt 11 looped over a plurality of the contact belt-orienting pulleys 14a and 14b in such a manner that the core material-exposed portion 9 travels along about one quarter of the periphery of the rotation roller 13 of the wheel type roller 10, as shown in FIGS. 2 and 4. However, in this Example, the meandering motion of the paste-coated sheet 6 was not corrected.

After the application over a length of 200 m, the aftermost coated portion (a portion at which the application completed) of the paste-coated sheet 6 was punched with a 30 mm diameter punch at six positions in the width direction, and then the standard deviation, in terms of percent by weight, of the application amount of the electrode mixture paste 5 after drying was determined and found to be σ=0.7%.

EXAMPLE 2

The same procedure as in Example 1 was repeated to produce a paste-coated sheet 6, except that the meandering motion detecting unit 12 was activated and that, when the amount of the meandering motion exceeded 1 mm, the meandering motion was corrected by changing the orientation of the shaft of the first body part 17 of the wheel type roller 10 in a direction opposite to the direction of the meandering motion by the method shown in FIG. 5.

After the application over a length of 200 m, the aftermost coated portion of the paste-coated sheet 6 was punched with a 30 mm diameter punch at six positions in the width direction, and then the standard deviation, in terms of percent by weight, of the application amount of the electrode mixture paste 5 after drying was determined and found to be σ=0.3%.

COMPARATIVE EXAMPLE

The same procedure as in Example 1 was repeated to produce a paste-coated sheet 6, except that, in the holding unit of the drying unit 7, contact pins 21 provided in a wheel type roller 20 were used in place of the contact belt 11, as shown in FIG. 7.

After the application over a length of 200 m, the aftermost coated portion of the paste-coated sheet 6 was punched with a 30 mm diameter punch at six positions in the width direction, and then the standard deviation, in terms of percent by weight, of the application amount of the electrode mixture paste 5 after drying was determined and found to be σ=1.7%.

As described above, in Examples 1 and 2, the core material-exposed portion 9 of the paste-coated sheet 6 is continuously held between the wheel type roller 10 and the contact belt 11. In these cases, the variations of the application amount were significantly reduced as compared to those in the Comparative Example in which the core material-exposed portion 9 of the paste-coated sheet 6 is intermittently held on the wheel type roller 20 with a part of the core material-exposed portion 9 held by the contact pins 21. The reason for this is as follows. Although the central portion of the paste-coated sheet 6 holding the electrode mixture paste 5 containing a hydrogen-absorption alloy having a high specific gravity of approximately 8 g/ml tends to deflect due to gravity, the deflection can be prevented since the core material-exposed portion 9 is continuously held in each of the Examples. Accordingly, the wrinkles of the paste-coated sheet 6 are not formed, and therefore the reduction in application accuracy due to the flow of the electrode mixture paste 5 can be avoided. It should be noted that, in Example 2 in which the meandering motion detecting unit 12 was activated to correct the meandering motion, the positional relationship between the wheel type roller 10 and the core material-exposed portion 9 was further stabilized as compared to that in Example 1. Therefore, it is conceivable that the variations in the application amount were further reduced as a result of the elimination of the microscopic strain of the paste-coated sheet 6.

INDUSTRIAL APPLICABILITY

As has been described, according to the present invention, even when the electrode mixture paste contains a material having a high specific gravity, the formation of wrinkles at the time of drying can be prevented, and the reduction in application accuracy due to the flow of the electrode mixture paste can be avoided. Therefore, a stable method for applying an electrode mixture paste can be provided, and the method is highly useful and can be widely used as a technique for manufacturing electrodes for various batteries including nickel metal-hydride storage batteries.

The invention claimed is:

1. An electrode mixture paste application method for applying an electrode mixture paste on a core material made of porous metal thin plate while traveling the core material, the method comprising:
    a first step of unwinding the core material wound in a coil shape;
    a second step of applying the electrode mixture paste onto the core material;
    a third step of adjusting an application amount of the electrode mixture paste;
    a fourth step of drying a paste-coated sheet with the electrode mixture paste applied to the both sides thereof; and
    a fifth step of winding the paste-coated sheet in a coil shape,
    wherein, in one of the second and third steps, a core material-exposed portion to which the electrode mixture paste is not applied is provided in both edge portions in a width direction of the core material,
    in the fourth step, a holding unit is provided in at least one position, the holding unit continuously holding the core material-exposed portion between a wheel type roller and a contact belt and changing a traveling direction of the paste-coated sheet, and
    in the fourth step, meandering motion control is enabled by changing an angle of the wheel type roller with respect to a traveling direction of the core material without changing an angle of the contact belt according to an amount of the meandering motion of the paste-coated sheet detected by a meandering motion detecting unit to control the traveling direction of the paste-coated sheet.

2. An electrode mixture paste application apparatus for applying an electrode mixture paste on a core material made of porous metal thin plate while traveling the core material, the apparatus comprising:
    an uncoiler unit for unwinding the core material wound in a coil shape;
    a paste application unit for applying the electrode mixture paste onto the core material;
    an application amount adjusting unit for adjusting an application amount of the electrode mixture paste;
    a drying unit ; and
    a coiler unit for winding a paste-coated sheet, after drying, in a coil shape,
    wherein one of the paste application unit and the application amount adjusting unit includes a paste removing unit for removing the electrode mixture paste applied to both edge portions in a width direction of the paste-coated sheet to form a core material-exposed portion ,
    wherein the drying unit includes a holding unit disposed in at least one position, the holding unit continuously holding the core material-exposed portion between a wheel type roller and a contact belt and changing a traveling direction of the paste-coated sheet, and wherein the drying unit further includes a meandering motion detecting unit for detecting an amount of meandering motion of the paste-coated sheet, and wherein the wheel type roller has a function capable of controlling the meandering motion by changing an angle thereof with respect to a traveling direction of the core material without changing an angle of the contact belt according to the amount of the meandering motion to control the traveling direction of the paste-coated sheet.

* * * * *